Oct. 2, 1951 W. C. MILLER 2,569,822
FISHING BOB
Filed March 20, 1946
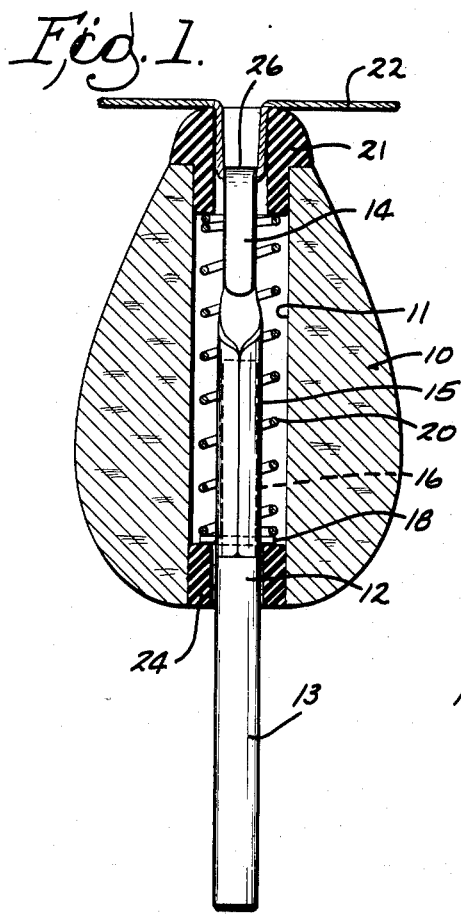
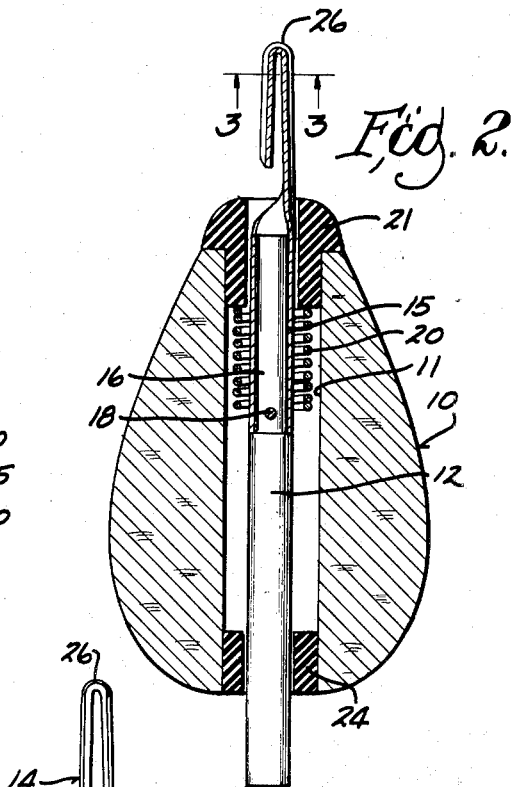
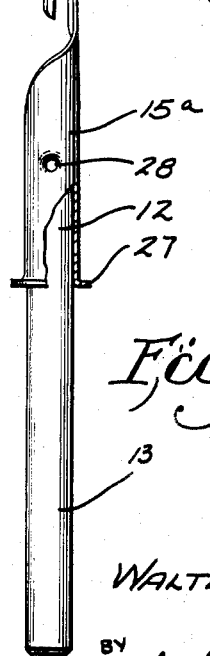
INVENTOR
WALTER C. MILLER
BY Wheeler, Wheeler & Wheeler
ATTORNEYS Patented Oct. 2, 1951

2,569,822

UNITED STATES PATENT OFFICE 2,569,822

FISHING BOB

Walter C. Miller, West Allis, Wis., assignor to Frabill Manufacturing Company, Milwaukee, Wis., a corporation of Wisconsin Application March 20, 1946, Serial No. 655,812

3 Claims. (Cl. 43—44.95)

My invention relates to improvements in fishing bobs.

The primary object of my invention is to provide a fishing bob having an instantly adjustable member through which a fish line may freely slip when the member is in one position, and which will fixedly secure the line to the bob when in another position.

Further objects are to provide a fishing bob which can be instantly released and re-attached to a fish line without impairing or cutting the line; to provide such a device which can be made at minimum expense; to provide means for protecting it against deterioration and decay; and, in general, to provide a more serviceable fishing bob than those heretofore available.

In the drawings:

Figure 1 is a sectional view of my improved fishing bob, showing the same in fixed engagement with a fish line.

Figure 2 is a similar view, showing the same in line releasing position.

Figure 3 is an enlarged sectional view, taken on line 3—3 of Figure 2, and showing the hook bend in perspective.

Figure 4 is a detail view, showing a slightly modified clutch rod.

Like parts are identified by the same reference characters throughout the several views.

In the construction illustrated, a generally egg-shaped body 10, preferably of cork, is provided with a bore 11 at its longer axis, in which a wooden rod 12 is mounted, with an exposed operating stem 13 at one end and a line engaging U-shaped metal hook 14 at the other end. The hook 14 has a tubular shank 15 which embraces a reduced portion 16 of the rod 12 and is secured thereto by a cross pin 18 which also serves as a seating for one end of a coiled compression spring 20. The other end of the spring seats against the inner end of an apertured plug 21, preferably of rubber, and which is fitted to the bore 11 at the smaller end of the body 10. The spring normally holds the hook 14 concealed within the plug 21, as shown in Figure 1, in which position it may bend an engaged line on an angular or non-rectilinear path into binding relation to the plug. But the hook may be instantly projected to the Figure 2 position by manually applying pressure to the exposed end 13 of the rod 12. The form of the hook is such that when it is projected to the Figure 2 position the line will be unbent from the plug to be released for free sliding movement and instantly readjusted to vary the distance between the bob and the fish hook.

Another apertured plug 24 is seated in the end of the bore at the larger end of the body, with the rod 12 extending therethrough. The apertured plugs 21 and 24 are cemented or shellacked to the body, whereby they are permanently secured in place and also serve as linings for the end portions of the bore to protect those portions against deterioration. When the hook bends the fish line into binding relation to the lining 21 it sinks into the rubber without any tendency to fray or weaken the line.

The portion of the metal member which forms the hook 14 is concavo-convex in cross section, as best shown in Figure 3, and the bend 26 in the hook is rounded or U-shaped as distinguished from a V-shaped angle. Therefore the fish line 22 slips freely through the hook when the latter is exposed in the Figure 2 position, the line being gripped against the associated plug only when drawn into the aperture in the plug, as shown in Figure 1. This is a very important feature of my invention. In my early experiments with hooks made from flat strips of metal with V-shaped bends, I found that the edges of the metal tended to cut the line and the line also became bound tightly in the sharp or V-shaped angle. When so bound it was difficult to release it for the purpose of varying the distance between the bob and the fish hook, and this also tended to break or fray the line. Therefore my earlier experimental models were impractical, but these objections were eliminated by rounding the bend 26 and forming the line engaging hook from a strip of sheet metal of concavo-convex cross section. As is clearly shown in Fig. 1 of the drawings the hook 14 is of less width than the aperture of the plug 21 in order to provide for clearance between the hook and the plug in order to accommodate the line 22 which is drawn into the plug aperture. By reason of this relationship, the line may be snubbed against the plug without being pinched or cut between the hook and the plug. It will be observed that normally no metal is visible to the fish, the hook 14 being concealed when the bob is in use, and the operating stem 13 being of wood.

In Figure 4 I have illustrated a slight modification, in which the shank 15a of the metal hook is provided with a flange 27 which serves as a seating for the spring. The metal of the shank 15a is indented at 28 to secure the shank to the operating rod 12.

I claim:

1. A fishing bob comprising a float having a bore, an apertured plug in each end of the bore, a compression spring housed within the bore between the respective plugs, and a stem provided with a hook and reciprocable through the apertures of the plugs and extending through the spring between said plugs, said stem being provided with a spring seat also normally engaged with one of said plugs to receive the pressure of said spring, the hook being wholly received into the other plug when said seat is so engaged and being reciprocable upon manipulation of said stem to a position in which it projects from said other plug to freely receive a line which is drawn into said other plug on a non-rectilinear path to be bent against the plug by the compression of said spring upon the release of said stem, said hook being of less width than the aperture of the plug to provide clearance for the line drawn into the plug whereby the line is snubbed about the plug without being pinched between the hook and the plug.

2. A fishing bob comprising a body having a bore and an internal spring chamber, a compression spring housed within said chamber, said body being provided with a removable tubular rubber plug fitted in one end of said bore and providing a spring seat and affording access to said chamber, a stem projecting from said body from the other end of said bore and provided within said chamber with a fitting extending through said spring and terminating in a hook normally completely concealed within the tubular plug in said bore and reciprocable to an exposed position outside of said plug and body upon the manipulation of said stem, said fitting having a seat engaged by said spring whereby said spring retracts said hook into the plug and opposes the manipulation of the stem to project the hook from the bore, the hook is narrower than said bore whereby a fish line about said hook and retracted with said hook into the bore is gripped against the plug.

3. In a fishing bobber adapted for detachable connection with a fish line, the combination with a body having a bore and a lining at one end of the bore, of a stem slidingly mounted in the bore with one end normally exposed and the other end provided with a hook normally housed within the bore, and a spring normally holding the hook within the bore, said stem being subject to pressure on its exposed end to project the hook from the bore where it may be loosely engaged by the line, release of said pressure permitting the spring to retract the hook to housed position and draw a portion of the line into a non-rectilinear path within the bore and against the bore lining, said stem having a relatively close fit within the bore, and the hook being of less width than the stem whereby to provide clearance between the bore and the hook to accommodate without pinching the line drawn by the hook into the bore.

WALTER C. MILLER.

REFERENCES CITED

The following references are of record in the file of this patent:

UNITED STATES PATENTS

| Number | Name | Date |
| --- | --- | --- |
| 522,167 | Rawlings | June 26, 1894 |
| 729,687 | Smith | June 2, 1903 |
| 1,110,568 | Ogden | Sept. 15, 1914 |
| 1,371,170 | Johnson | Mar. 8, 1921 |
| 1,504,065 | Lower | Aug. 5, 1924 |
| 1,850,748 | Foster | Mar. 22, 1932 |
| 1,942,738 | Zimmer | Jan. 9, 1934 |
| 2,231,270 | Huston | Feb. 11, 1941 |
| 2,255,853 | Makus et al. | Sept. 16, 1941 |